(12) United States Patent
Yang et al.

(10) Patent No.: US 10,720,981 B2
(45) Date of Patent: Jul. 21, 2020

(54) SPATIAL MULTIPLEXING OF A SOUNDING REFERENCE SIGNAL (SRS) AND A PHYSICAL UPLINK SHARED CHANNEL (PUSCH) COMMUNICATION

(71) Applicant: QUALCOMM Incorporated, San Diego, CA (US)

(72) Inventors: Wei Yang, San Diego, CA (US); Alexandros Manolakos, San Diego, CA (US); Yi Huang, San Diego, CA (US); Joseph Binamira Soriaga, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/407,734

(22) Filed: May 9, 2019

(65) Prior Publication Data

US 2019/0349066 A1    Nov. 14, 2019

(30) Foreign Application Priority Data

May 11, 2018  (GR) .............................. 20180100202

(51) Int. Cl.
| | |
|---|---|
| *H04K 1/10* | (2006.01) |
| *H04L 27/28* | (2006.01) |
| *H04B 7/06* | (2006.01) |
| *H04W 72/12* | (2009.01) |
| *H04L 5/00* | (2006.01) |

(52) U.S. Cl.
CPC ......... *H04B 7/0697* (2013.01); *H04L 5/0023* (2013.01); *H04W 72/1268* (2013.01); *H04W 72/1289* (2013.01)

(58) Field of Classification Search
CPC .............. H04B 7/0697; H04B 7/0404; H04W 72/1268; H04W 72/0406; H04W 72/1289; H04L 5/0023
USPC .................................................. 375/260, 346
See application file for complete search history.

(56) References Cited

U.S. PATENT DOCUMENTS

| | | | |
|---|---|---|---|
| 2013/0176868 A1* | 7/2013 | Gaal | H04B 7/0404 370/252 |
| 2016/0119100 A1 | 4/2016 | Chung et al. | |
| 2019/0132821 A1* | 5/2019 | Goto | H04W 72/0406 |

OTHER PUBLICATIONS

U.S. Appl. No. 16/293,986, filed Mar. 6, 2019.*

(Continued)

*Primary Examiner* — Phuong Phu

(74) *Attorney, Agent, or Firm* — Harrity & Harrity, LLP

(57) ABSTRACT

Various aspects of the present disclosure generally relate to wireless communication. In some aspects, a user equipment (UE) may receive a configuration that indicates whether the UE is to spatially multiplex multiple uplink transmissions, wherein the multiple uplink transmissions are a sounding reference signal (SRS) and a physical uplink shared channel (PUSCH) communication. In some aspects, the user equipment may configure the multiple uplink transmissions based at least in part on the configuration. Numerous other aspects are provided.

30 Claims, 12 Drawing Sheets

(56) References Cited

OTHER PUBLICATIONS

Huawei et al., "Antenna Selection Transmission for PUSCH", 3GPP Draft; R1-1800909, 3rd Generation Partnership Project (3GPP), Mobile Competence Centre ; 650, Route Des Lucioles ; F-06921 Sophia-Antipolis Cedex ; France, vol. RAN WG1, No. Vancouver, Canada; Jan. 22, 2018-Jan. 26, 2018, Jan. 13, 2018 (Jan. 13, 2018), XP051385158, 3 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018].

International Search Report and Written Opinion—PCT/US2019/031826—ISA/EPO—dated Aug. 1, 2019.

Qualcomm Incorporated: "Discussion on Simultaneous PUSCH and SRS Transmission from Different Antenna Ports", 3GPP Draft; R1-1712769 Discussion on Simultaneous PUSCH and SRS Transmission From Different Antenna Ports, 3rd Generation Partnership Project (3GPP), Mobile Competence Centre ; 650, Route Des Lucioles, vol. RAN WG1, No. Prague, Czechia; Aug. 21, 2017-Aug. 25, 2017, Aug. 20, 2017 (Aug. 20, 2017), XP051315581, 5 Pages, Retrieved from the Internet: URL:http://www.3gpp.org/ftp/Meetings_3GPP_SYNC/RAN1/Docs/ [retrieved on Aug. 20, 2017].

Qualcomm Incorporated: "SRS Antenna Switching for 1T4R and 2T4R", 3GPP Draft; R1-1805278 SRS Antenna Switching Rev, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018, XP051427507, 19 pages, Retrieved from the Internet: URL: http://www.3gpp.org/ftp/Meetings%5F3GPP%5FSYNC/RAN1/Docs/ [retrieved on Apr. 15, 2018].

Sony: "Summary of SRS", 3GPP Draft; R1-1801085—Summary of SRS V0.5.1, 3rd Generation Partnership Project (3GPP), Mobile Competence Centre ; 650, Route Des Lucioles ; F-06921 Sophia-Antipolis Cedex; France, vol. RAN WG1, No. Vancouver; Jan. 22, 2018-Jan. 26, 2018, Jan. 26, 2018 (Jan. 26, 2018), XP051385338, 53 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 26, 2018], p. 9.

\* cited by examiner

SPATIAL MULTIPLEXING OF A SOUNDING REFERENCE SIGNAL (SRS) AND A PHYSICAL UPLINK SHARED CHANNEL (PUSCH) COMMUNICATION

CROSS-REFERENCE TO RELATED APPLICATIONS UNDER 35 U.S.C. § 119

This application claims priority to Greek Patent Application No. 20180100202, filed on May 11, 2018, entitled "TECHNIQUES AND APPARATUSES FOR SPATIAL MULTIPLEXING OF A SOUNDING REFERENCE SIGNAL (SRS) AND A PHYSICAL UPLINK SHARED CHANNEL (PUSCH) COMMUNICATION," which is hereby expressly incorporated by reference herein.

FIELD OF THE DISCLOSURE

Aspects of the present disclosure generally relate to wireless communication and to techniques and apparatuses for spatial multiplexing of a sounding reference signal (SRS) and a physical uplink shared channel (PUSCH) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a configuration that indicates whether the UE is to spatially multiplex multiple uplink transmissions, wherein the multiple uplink transmissions are a sounding reference signal (SRS) and a physical uplink shared channel (PUSCH) communication. The method may include configuring the multiple uplink transmissions based at least in part on the configuration.

In some aspects, a user equipment (UE) for wireless communication may include memory and one or more processors operatively coupled to the memory. The memory and the one or more processors may be configured to receive a configuration that indicates whether the UE is to spatially multiplex multiple uplink transmissions, wherein the multiple uplink transmissions are a sounding reference signal (SRS) and a physical uplink shared channel (PUSCH) communication. The memory and the one or more processors may be configured to configure the multiple uplink transmissions based at least in part on the configuration.

In some aspects, a non-transitory computer-readable medium may store one or more instructions for wireless communication. The one or more instructions, when executed by one or more processors of a user equipment (UE), may cause the one or more processors to receive a configuration that indicates whether the UE is to spatially multiplex multiple uplink transmissions, wherein the multiple uplink transmissions are a sounding reference signal (SRS) and a physical uplink shared channel (PUSCH) communication. The one or more instructions, when executed by the one or more processors, may cause the one or more processors to configure the multiple uplink transmissions based at least in part on the configuration.

In some aspects, an apparatus for wireless communication may include means for receiving a configuration that indicates whether the apparatus is to spatially multiplex multiple uplink transmissions, wherein the multiple uplink transmissions are a sounding reference signal (SRS) and a physical uplink shared channel (PUSCH) communication. The apparatus may include means for configuring the multiple uplink transmissions based at least in part on the configuration.

In some aspects, a method of wireless communication, performed by a base station (BS), may include receiving capability information that indicates a capability of a user equipment (UE) to spatially multiplex multiple uplink transmissions, wherein the multiple uplink transmissions are a sounding reference signal (SRS) and a physical uplink shared channel (PUSCH) communication. The method may include transmitting a configuration that indicates whether the UE is to spatially multiplex the multiple uplink transmissions.

In some aspects, a base station for wireless communication may include memory and one or more processors operatively coupled to the memory. The memory and the one or more processors may be configured to receive capability information that indicates a capability of a user equipment (UE) to spatially multiplex multiple uplink transmissions, wherein the multiple uplink transmissions are a sounding reference signal (SRS) and a physical uplink shared channel (PUSCH) communication. The memory and the one or more processors may be configured to transmit a configuration that indicates whether the UE is to spatially multiplex the multiple uplink transmissions.

In some aspects, a non-transitory computer-readable medium may store one or more instructions for wireless communication. The one or more instructions, when executed by one or more processors of a base station, may cause the one or more processors to receive capability information that indicates a capability of a user equipment (UE) to spatially multiplex multiple uplink transmissions, wherein the multiple uplink transmissions are a sounding reference signal (SRS) and a physical uplink shared channel (PUSCH) communication. The one or more instructions, when executed by the one or more processors, may cause the one or more processors to transmit a configuration that indicates whether the UE is to spatially multiplex the multiple uplink transmissions.

In some aspects, an apparatus for wireless communication may include means for receiving capability information that indicates a capability of a user equipment (UE) to spatially multiplex multiple uplink transmissions, wherein the multiple uplink transmissions are a sounding reference signal (SRS) and a physical uplink shared channel (PUSCH) communication. The apparatus may include means for transmitting a configuration that indicates whether the UE is to spatially multiplex the multiple uplink transmissions.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
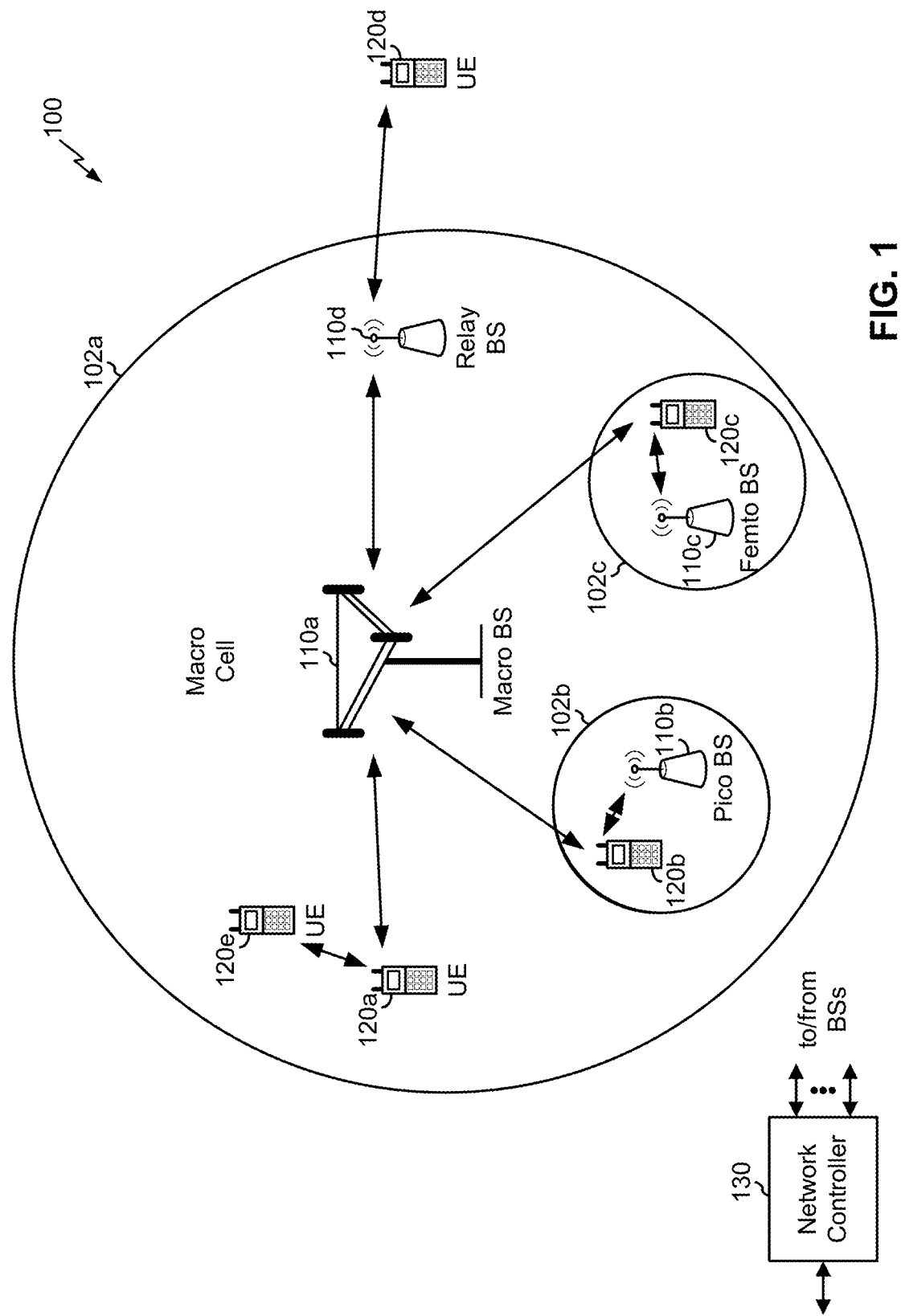
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
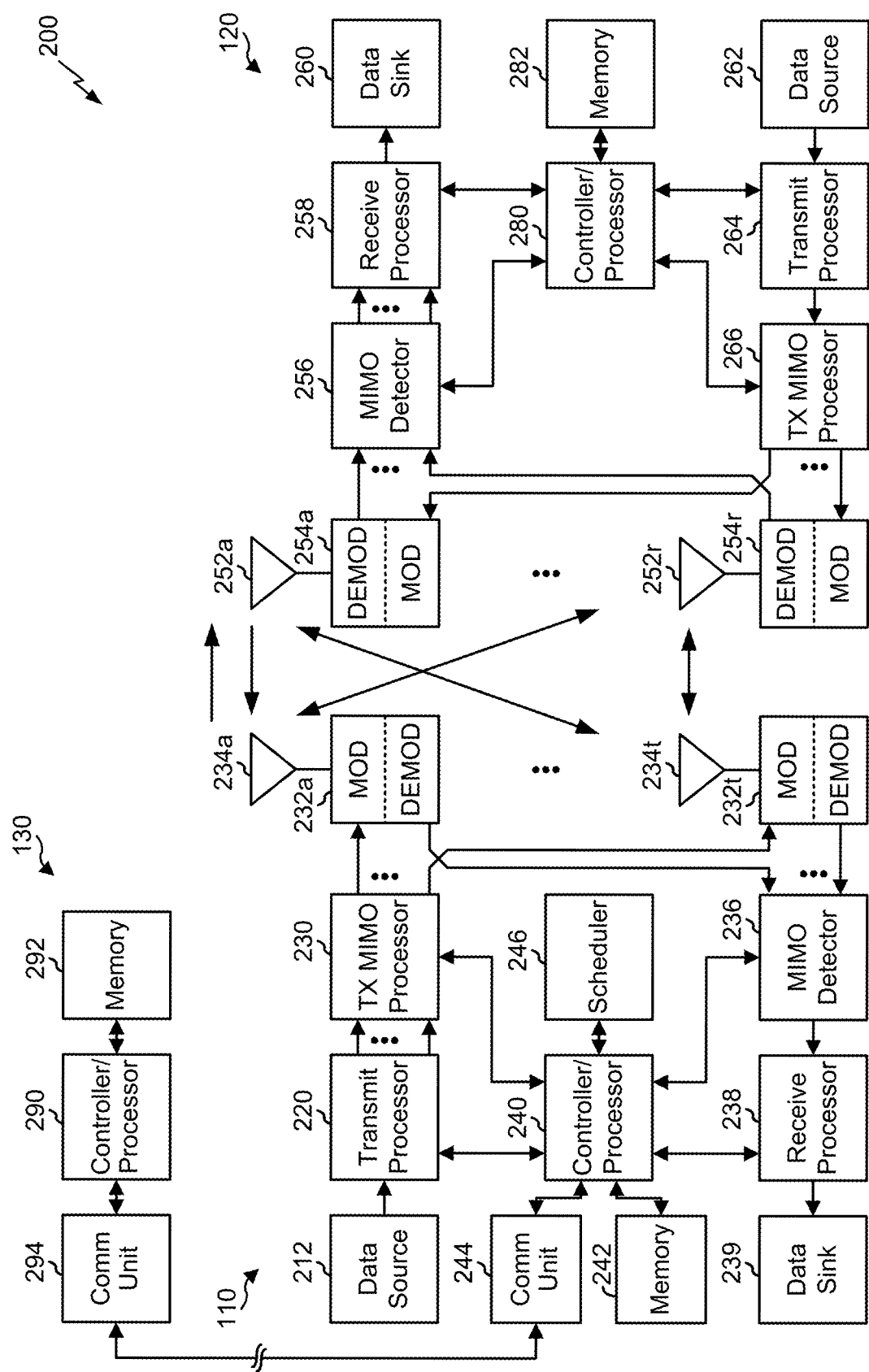
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with spatial multiplexing of an SRS and a PUSCH communication, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a configuration that indicates whether the UE is to spatially multiplex multiple uplink transmissions, means for configuring the multiple uplink transmissions based at least in part on the configuration, and/or the like. In some aspects, such means may include one or more components of UE 120 described in connection with FIG. 2.

In some aspects, base station 110 may include means for receiving capability information that indicates a capability of a UE to spatially multiplex multiple uplink transmissions, means for transmitting a configuration that indicates whether the UE is to spatially multiplex the multiple uplink transmissions, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
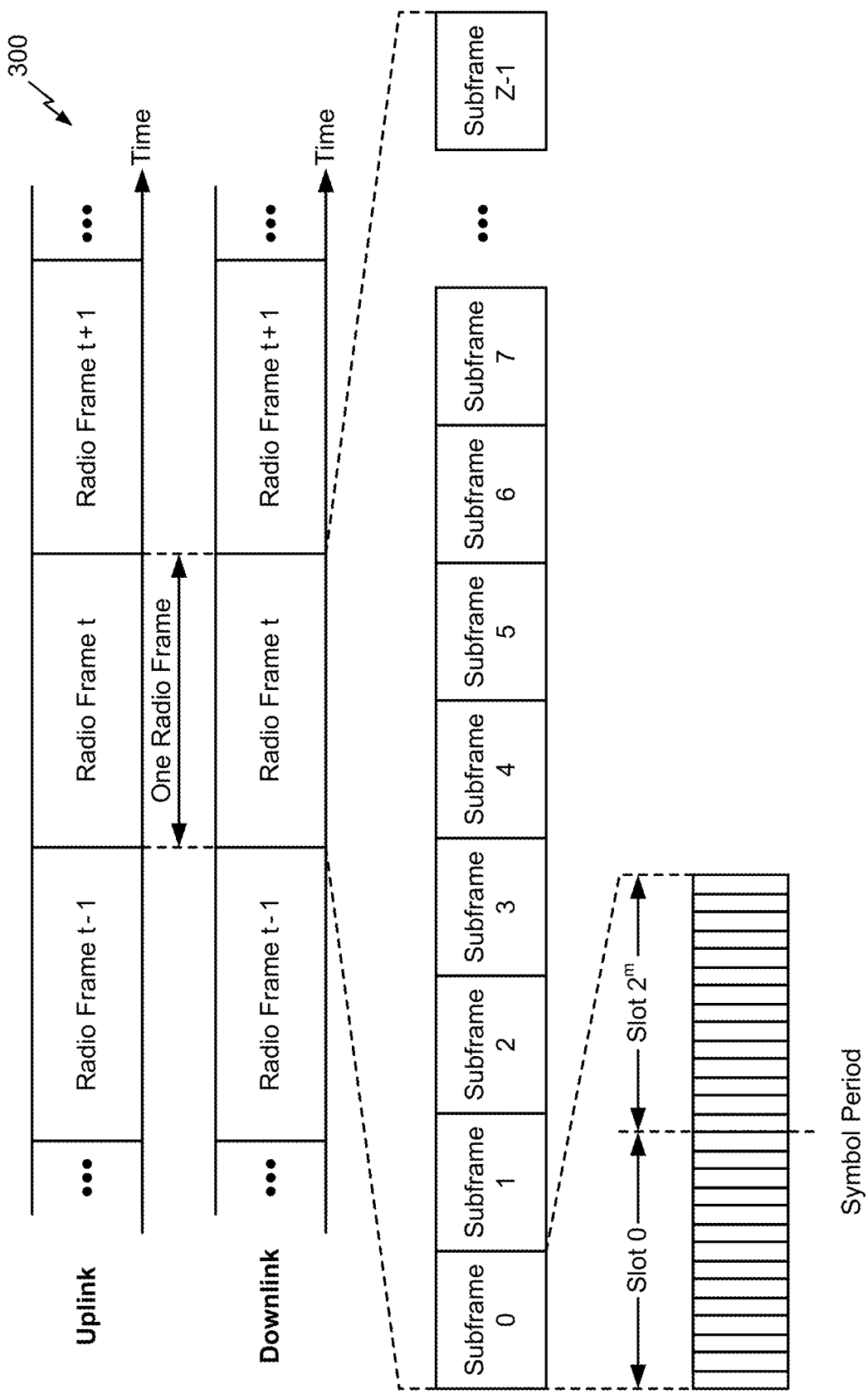
FIG. 3A is a block diagram conceptually illustrating an example of a frame structure in a wireless communication network, in accordance with various aspects of the present disclosure.

FIG. 3A shows an example frame structure 300 for frequency division duplex (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
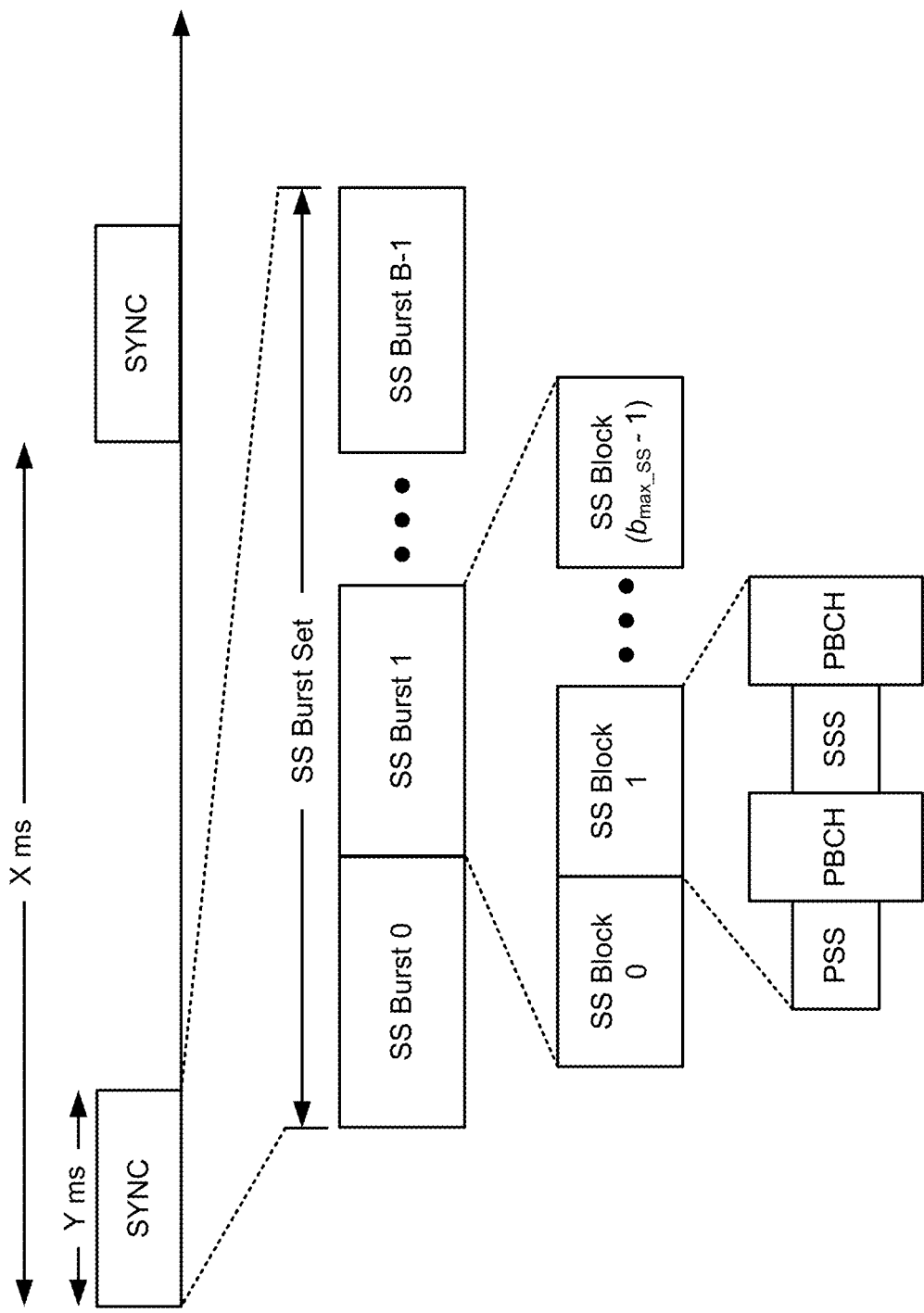
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
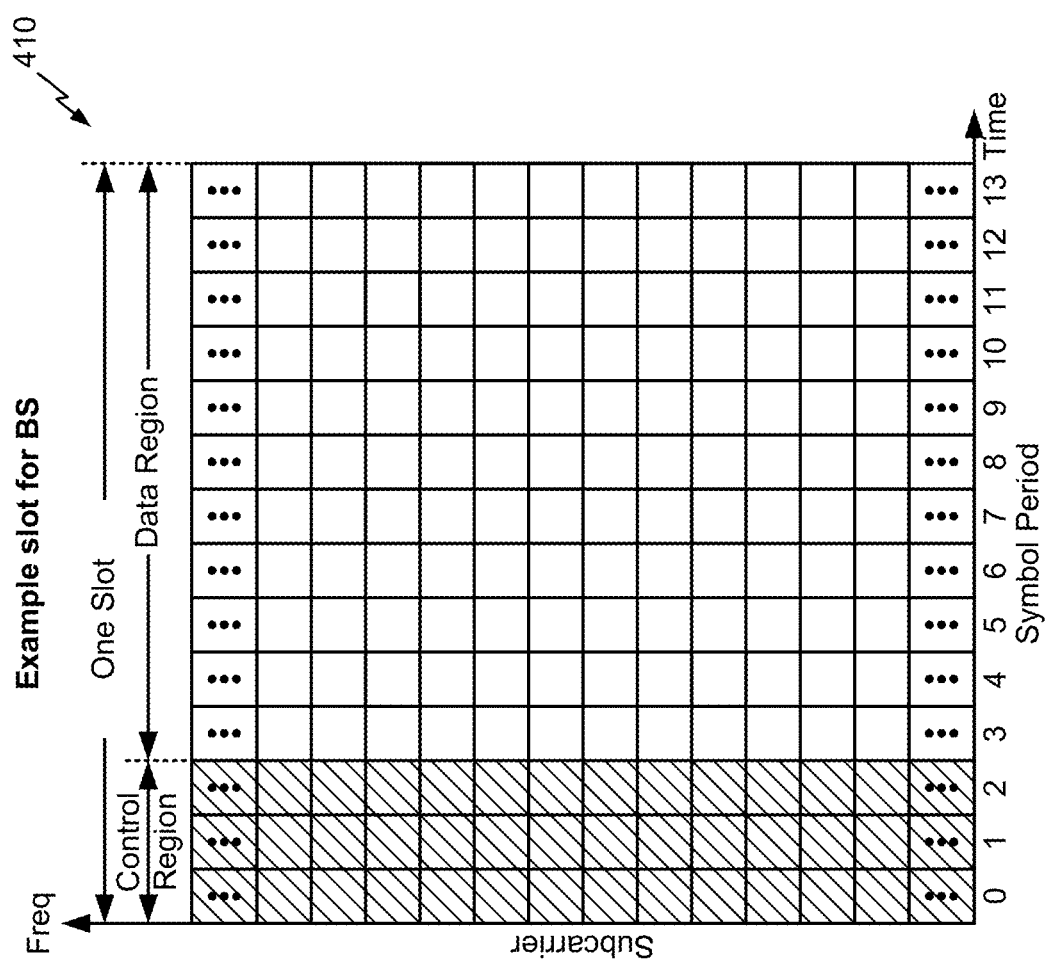
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-and-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplex (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
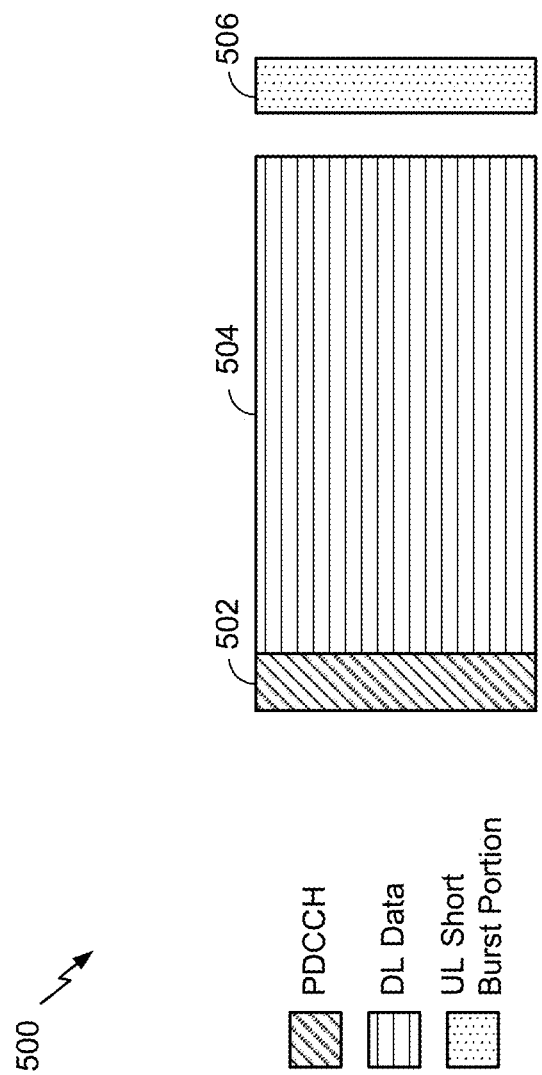
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

Figure 6:
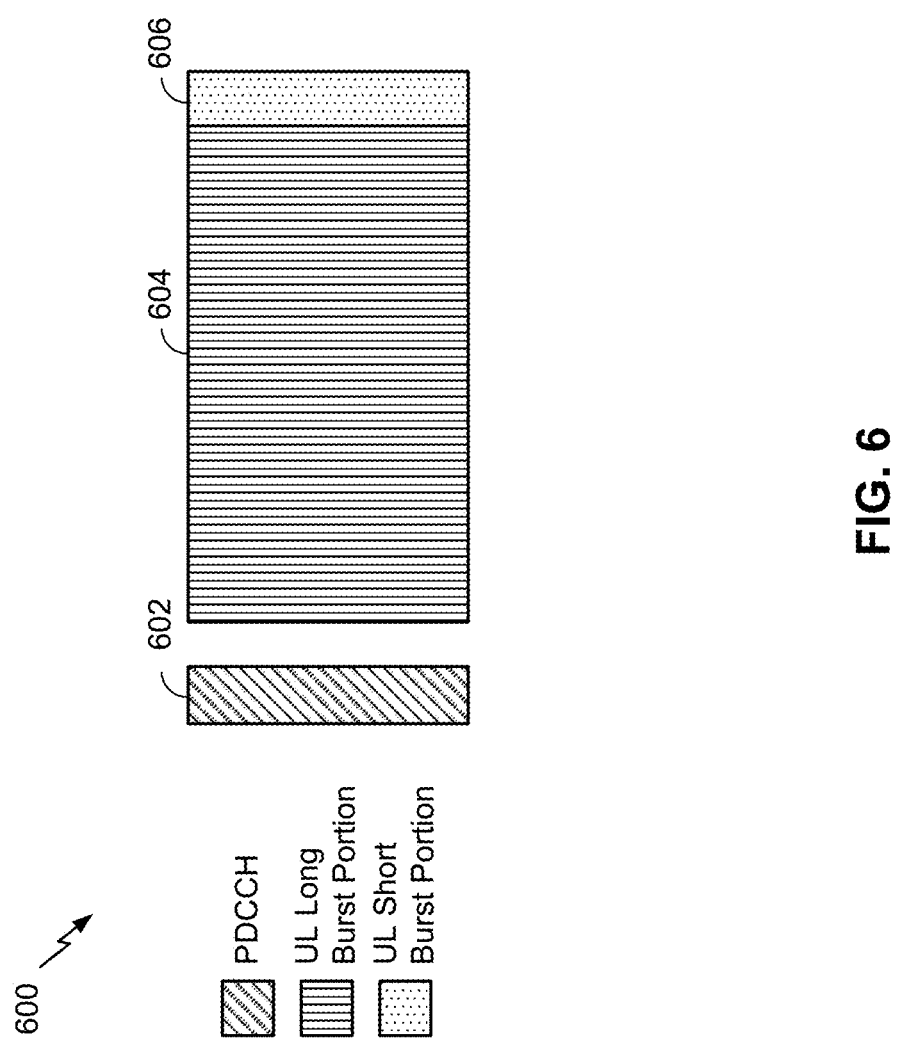
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples are possible and may differ from what was described with regard to FIG. 6.

In NR, multiple uplink transmissions (e.g., PUSCH communications, PUCCH communications, SRSs, and/or the like) within one component carrier (CC) can only be multiplexed utilizing time division multiplexing (TDM). This can cause issues when the multiple uplink transmissions are scheduled to overlap in at least one symbol (e.g., a scenario referred to herein as collision). For example, if a sounding reference signal (SRS) and a PUSCH communication are scheduled to overlap in at least one symbol, the UE may need to drop the SRS to avoid collision of the SRS and the PUSCH communication (e.g., based on a set of rules that indicate various manners in which to avoid the collision of the SRS and the PUSCH communication). This can negatively impact channel evaluation by a base station (BS) via dropping of the SRS, via delayed transmission of the SRS, and/or the like.

In addition, this may prevent the UE from being utilized in contexts where providing multiple uplink transmissions (e.g., an SRS and a PUSCH communication) simultaneously is needed for effective communications. For example, this may prevent the UE from being utilized for low latency transmissions, grant-free transmissions, ultra-reliable low latency communications (URLLCs), low data payload transmissions, and/or the like. Continuing with the previous example, for effective communications in these contexts, a UE may need to be capable of sending an SRS and a PUSCH communication overlapped in one or more symbols so that the BS can schedule accurate and timely antenna switching from the UE for future PUSCH communications and/or PUCCH communications. Currently, UEs may not have this capability.

Some techniques and apparatuses described herein provide for utilizing spatial multiplexing for multiple uplink transmissions in one or more overlapping symbols. Specifically, some techniques and apparatuses described herein provide for spatial multiplexing of an SRS and a PUSCH communication in one or more overlapping symbols. For example, some techniques and apparatuses described herein provide a UE that is capable of transmitting an SRS and a PUSCH communication via different antenna ports and/or different physical antennas, such as when the SRS and the PUSCH communication are scheduled to overlap in one or more symbols. Some techniques and apparatuses described herein provide for signaling of such a capability and configuration of the UE and/or the BS to perform the spatial multiplexing for multiple uplink transmissions. Thus, techniques and apparatuses described herein may reduce and/or eliminate dropped transmissions of a UE (e.g., dropping of an uplink transmission that is scheduled to collide with another uplink transmission). In addition, this may facilitate deployment of a UE in one or more new contexts, such as contexts that include low latency transmissions and/or grant-free transmissions. Further, this may improve communications between a UE and a BS by facilitating antenna switching for PUSCH communications. Further, this improves throughput of a channel between a UE and a BS via use of spatial multiplexing to facilitate simultaneous transmission of multiple uplink communications.

Figure 7:
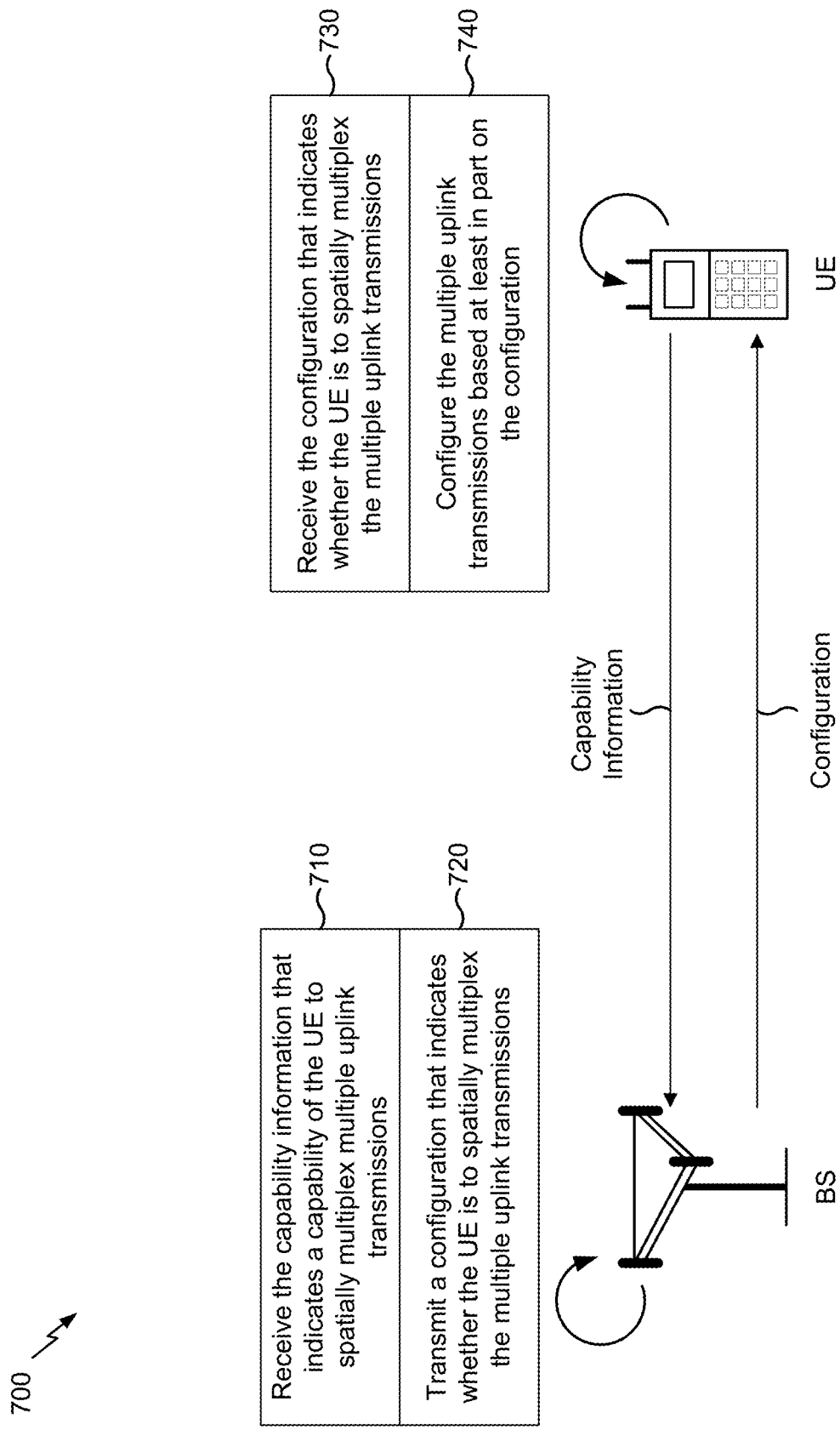
FIG. 7 is a diagram illustrating an example of spatial multiplexing of a sounding reference signal (SRS) and a physical uplink shared channel (PUSCH) communication, in accordance with various aspects of the present disclosure.

FIG. 7 is a diagram illustrating an example 700 of spatial multiplexing of an SRS and a PUSCH communication, in accordance with various aspects of the present disclosure. As shown in FIG. 7, example 700 includes a BS and a UE.

As shown in FIG. 7, and as shown by reference number 710, the UE may transmit, to the BS and the BS may receive, capability information that indicates a capability of the UE to spatially multiplex multiple uplink transmissions. In some aspects, the capability information may indicate a capability of the UE to spatially multiplex an SRS and a PUSCH communication (e.g., the capability information may be on a per-frequency band basis (or a per-cell group basis or a per-PUCCH group basis) and the UE may signal the capability information for each frequency band (or cell group or PUCCH group) separately). In some aspects, the UE may transmit the capability information in association with attachment to a network, in association with establishment of a connection to the BS, based on receiving a request from the BS to provide the capability information, periodically, according to a schedule, and/or the like.

As shown by reference number 720, the BS may transmit a configuration that indicates whether the UE is to spatially multiplex the multiple uplink transmissions. In some aspects, the configuration may include a value configured in a radio resource control (RRC) parameter. For example, the BS may transmit the configuration as an RRC parameter (e.g., a 1 bit RRC parameter) to indicate whether the UE is to spatially multiplex the multiple uplink transmissions. In some aspects, the BS may transmit the configuration to the UE as part of the configuration of one of the uplink transmissions. For example, the BS may transmit a configuration that indicates whether the UE is to spatially multiplex a PUSCH communication or a PUCCH communication with an SRS as part of the SRS configuration (e.g., the BS may transmit the configuration on a per-frequency band basis (or a per-cell group basis or a per-PUCCH group basis). In some aspects, the BS may determine whether to perform joint processing across multiple SRS resources based at least in part on the configuration. For example, the BS may determine whether to perform joint processing across periodic SRS resources based at least in part on an RRC parameter that indicates whether the UE is to spatially multiplex another uplink transmission with the SRS.

In some aspects, the configuration may be compatible with UEs that have different capabilities. For example, the BS can use the configuration to indicate to a UE to spatially multiplex an SRS and a PUSCH communication without causing operational issues to another UE that does not have this capability. In some aspects, the configuration may include a value that indicates that the UE is to spatially multiplex multiple uplink communications when the UE is capable of a codebook-based technique in association with an SRS or a non-codebook-based technique in association with the SRS, as described elsewhere herein.

In some aspects, the BS may transmit, to the UE, an indication to operate in a particular multiplexing mode in association with transmitting the configuration. In some aspects, the BS may need to transmit an indication to the UE to operate in a multiplexing mode, such as when a network supports multiple multiplexing modes (e.g., described elsewhere herein). As a specific example, when the UE is scheduled to transmit the SRS and the PUSCH communication in a same symbol and/or a same set of resource blocks, the UE may need to use the second multiplexing mode or the third multiplexing mode described below. In this case, the BS may need to transmit (e.g., in an uplink grant and/or in association with an RRC configuration) an indication to the UE to operate in the second multiplexing mode or the third multiplexing mode.

As shown by reference number 730, the UE may receive the configuration that indicates whether the UE is to spatially multiplex the multiple uplink transmissions (e.g., the configuration transmitted by the BS). In some aspects, the UE may receive the configuration from the BS in association with an SRS resource configuration of the UE by the BS. Additionally, or alternatively, the UE may receive the configuration from the BS in association with an RRC message (e.g., from the BS, as a parameter in the RRC message, and/or the like).

As shown by reference number 740, the UE may configure the multiple uplink transmissions based at least in part on the configuration. In some aspects, the UE may configure a multiplexing mode for the multiple uplink transmissions when configuring the multiple uplink transmissions. For example, the multiplexing mode may control a manner in which the SRS is multiplexed with another communication (e.g., a PUSCH communication, a DMRS, and/or the like). In some aspects, the multiplexing mode may include a first multiplexing mode where the SRS is multiplexed with a DMRS on a symbol associated with the DMRS utilizing frequency division multiplexing (FDM). For example, the SRS and DMRS can be transmitted on different sets of resource blocks (RBs) or in the same sets of RBs but using different combs (for example, SRS may be transmitted on even subcarriers, and DMRS may be transmitted on odd subcarriers). In some aspects, this first multiplexing mode may reduce or eliminate a need for the BS to change signaling to schedule this type of transmission, thereby conserving computing resources and/or processing resources of the BS. Additionally, or alternatively, the multiplexing mode may include a second multiplexing mode where the SRS is multiplexed with the PUSCH communication utilizing FDM. For example, the PUSCH communication may be transmitted on a different set of RBs from the SRS, or the PUSCH communication may be transmitted on a same set of RBs and is rate-matched around the resource elements that are overlapping with the SRS. Additionally, or alternatively, the multiplexing mode may include a third multiplexing mode where the SRS is multiplexed with the PUSCH communication utilizing spatial division multiplexing. In some aspects, a multiplexing mode may include multiplexing an SRS with another uplink transmission utilizing time division multiplexing (TDM), code division multiplexing (CDM), and/or the like.

In some aspects, for the third multiplexing mode the UE may need to receive an indication from the BS as to whether to operate in a particular multiplexing mode (e.g., the first multiplexing mode, the second multiplexing mode, or the third multiplexing mode described elsewhere herein). In some aspects, the UE may receive this indication in an uplink grant and/or an RRC configuration from the BS. In some aspects, the UE may receive an indication from the BS as to whether to operate in the second multiplexing mode or the third multiplexing mode (e.g., in association with receiving the configuration from the BS).

In some aspects, the BS may provide an indication to operate in a particular multiplexing mode based at least in part on a scheduling of multiple uplink transmissions and/or a configuration of the UE. For example, if an SRS and a DMRS are scheduled on different sets of resource blocks or different frequency tones on a same set of resource blocks (e.g., on different frequency domain combs), the UE may receive an indication to operate in the first multiplexing mode (or may determine to operate in the first multiplexing mode based at least in part on not receiving an indication from the BS to operate in a particular multiplexing mode). Additionally, or alternatively, and as another example, the UE may receive an indication to operate in the second multiplexing mode based at least in part on an SRS and a PUSCH communication being scheduled to collide and the UE not being configured to spatially multiplex multiple uplink transmissions. Additionally, or alternatively, and as another example, the UE may receive an indication to operate in the third multiplexing mode based at least in part on an SRS and a PUSCH communication being scheduled to collide and the UE being configured to spatially multiplex multiple uplink transmissions.

In some aspects, configuring the multiple uplink transmissions may include configuring a phase coherency mode for the multiple uplink transmissions (e.g., the BS may need to use information identifying whether phases of the PUSCH communication are maintained before, during, and/or after collision with the SRS to perform channel estimation, data demodulation, and/or the like when needed). For example, the phase coherency mode may control a manner in which the UE maintains a phase coherence of the multiple uplink transmissions. In some aspects, the phase coherency mode may include a first phase coherency mode where the UE is expected to maintain the phase coherence of the multiple uplink transmissions. Additionally, or alternatively, the phase coherency mode may include a second phase coherency mode where the UE is not expected to maintain the phase coherence of the multiple uplink transmissions.

In some aspects, if the UE is configured to transmit the PUSCH communication and the SRS on a same symbol, a same physical resource block (PRB), and/or different antenna ports, then the UE may utilize a set of pre-defined rules (and/or RRC configured rules) to determine whether the UE is expected to maintain the phase coherence of the PUSCH communication before, during, and/or after collision with the SRS. For example, the set of pre-defined rules may indicate that the UE is expected to maintain phase coherence during a first time period, and that the UE is not expected to maintain phase coherence during a second time period. In some aspects, if the UE is expected to maintain a phase coherence, the UE may map different antenna ports to different physical antennas associated with the UE (e.g., when configuring the first phase coherency mode). In this case, when the UE transmits the SRS and the PUSCH communication, the UE may map the SRS and the PUSCH communication to different physical antennas to implement spatial division multiplexing.

In some aspects, whether the UE is expected to maintain a phase coherence may depend on an SRS configuration of the UE. For example, the UE may determine that the UE is configured to utilize a codebook-based technique in association with the SRS (e.g., where the UE is configured with usage set to codebook for the SRS in a resource set and/or where the UE sounds all antenna ports and the BS transmits a transmitted precoding matrix indicator (TPMI) from a codebook based on the SRS) or a non-codebook-based technique in association with the SRS (e.g., where the UE is configured with usage set to non-codebook for the SRS in a resource set and/or where the UE computes a precoder based on a downlink reference signal (DL RS) and precodes the SRS utilizing the precoder), and that the UE is configured to utilize a multiplexing technique (e.g., FDM, spatial division multiplexing, and/or the like) in association with the SRS and the PUSCH communication. In this case, the UE may configure the first phase coherency mode (e.g., where the UE is expected to maintain a phase coherence of the PUSCH communication and the SRS).

Additionally, or alternatively, and as another example, the UE may determine that the UE is configured to utilize an antenna switching technique in association with the SRS (e.g., where the UE is configured with antenna switching for the SRS in a resource set and/or where the UE sounds different antennas, or sets of antennas, separately and the BS transmits information identifying a particular antenna, or set of antennas, to the UE that the UE is to use), and that the UE is configured to utilize a multiplexing technique in association with the SRS and the PUSCH communication. In this case, the UE may configure the second phase coherency mode (e.g., where the UE is not expected to maintain the phase coherence of the PUSCH communication and the SRS).

In some aspects, when operating in the second phase coherency mode, the UE may transmit a DMRS or a phase-tracking reference symbol (PTRS) before, during, and/or after the colliding symbols of SRS and PUSCH communication to the BS to facilitate channel estimation by the BS (e.g., the UE may transmit the DMRS or the PTRS on one or more of three portions of an uplink transmission). Additionally, or alternatively, when operating in the second phase coherency mode, the UE may determine that the PUSCH communication and the SRS are scheduled to overlap in one or more symbols and may transmit the SRS in association with the PUSCH communication in the one or more symbols. For example, the UE may transmit the SRS in association with the PUSCH communication when the SRS and the PUSCH communication are scheduled to collide, and may not transmit the DMRS and/or the PTRS on the colliding symbol(s). By transmitting the SRS and not transmitting the DMRS and/or the PTRS, the SRS is used as a DMRS for a PUSCH communication, thereby facilitating channel estimation, by a BS, for the PUSCH communication based at least in part on the SRS.

In some aspects, the UE may transmit, to the BS, an indicator after configuring the phase coherency mode. For example, the indicator may indicate whether the phase coherence of the PUSCH communication is maintained by the UE or is not maintained by the UE, whether the UE is operating in the first phase coherency mode or the second phase coherency mode, and/or the like. In this way, the UE may dynamically signal to the BS whether the UE can (or is expected to) maintain phase coherence of the PUSCH communication and the SRS. In some aspects, the indicator may be included in a communication, from the UE, associated with an SRS configuration (e.g., the indicator may be a 1 bit indicator included in the communication).

In some aspects, the UE may determine an antenna port, of a set of antenna ports, for the SRS prior to transmitting the indicator to the BS. For example, the UE may be configured with multiple SRS ports (e.g., antenna ports capable of transmitting an SRS), and the UE may select one of the SRS ports for transmission of the SRS. In some aspects, the UE may transmit information identifying the antenna port to be used for the SRS to the BS (e.g., the indicator used to identify the phase coherency mode that the UE configured may further identify the antenna port that the UE is to use for the SRS). In some aspects, the UE may transmit the SRS and/or the PUSCH communication to the BS after configuring the multiple uplink transmissions. For example, the UE may transmit the SRS and the PUSCH communication utilizing spatial diversity multiplexing. Continuing with the previous example, the UE may transmit, to the BS, the SRS via an antenna and/or an antenna port associated with the UE, and may transmit, to the BS, the PUSCH communication via a different antenna and/or antenna port associated with the UE.

In some aspects, after the UE transmits the SRS and/or the PUSCH communication, the UE may receive, from the BS, uplink downlink control information (DCI) that indicates whether to switch an antenna port for an uplink transmission of the multiple uplink transmissions, and the UE may determine whether to switch the antenna port based on the DCI. For example, the BS may determine whether the UE is to switch an antenna port for one of the multiple uplink transmissions from the UE based at least in part on a respective channel quality of the multiple antenna ports (e.g., as determined based at least in part on the SRS and/or the PUSCH communication from the UE). In some aspects, the DCI may include a value configured in a SRS resource index (SRI) field to indicate whether the UE is to switch the antenna port (e.g., a value configured by the BS in the SRI and prior to transmitting the DCI to the UE).

As indicated above, FIG. 7 is provided as an example. Other examples are possible and may differ from what was described with respect to FIG. 7.

Figure 8:
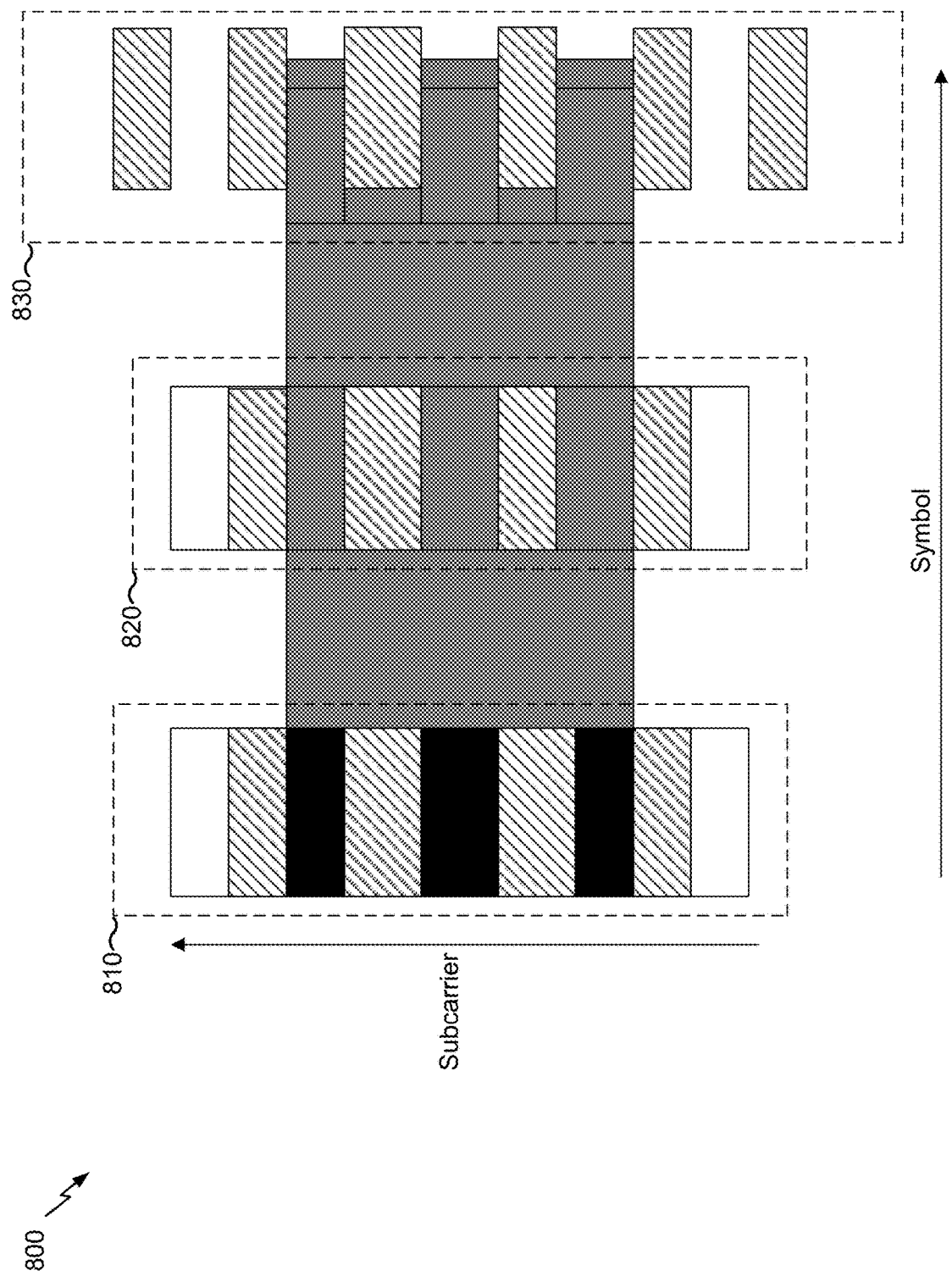
FIG. 8 is a diagram illustrating various examples of multiplexing multiple uplink transmissions in various multiplexing modes, in accordance with various aspects of the present disclosure.

FIG. 8 is a diagram illustrating various examples 800 of multiplexing multiple uplink transmissions in various multiplexing modes, in accordance with various aspects of the present disclosure. For example, FIG. 8 shows various symbols for uplink transmissions from a UE and various ways in which the UE can multiplex multiple uplink transmissions in the various symbols. The stripped pattern boxes shown in FIG. 8 show resource elements that include data related to an SRS. The black boxes shown in FIG. 8 show resource elements that include data related to DMRS. The dark grey boxes shown in FIG. 8 show resource elements that include data related to a PUSCH communication. The white boxes shown in FIG. 8 show empty resource elements, resources elements that include other types of data, and/or the like.

As shown by reference number 810, a UE may multiplex an SRS with DMRS in a DMRS-related symbol (e.g., the SRS may be multiplexed with front-loaded DMRS). For example, the UE may multiplex the SRS with the DMRS utilizing FDM (e.g., utilizing FDM may include transmitting an SRS and a DMRS on different sets of resource blocks, or transmitting an SRS and a DMRS on different frequency combs of the same set of resource blocks (e.g., even tones for DMRS and odd tones for SRS, or vice versa)). In some aspects, the UE may multiplex an SRS in this manner when operating in the first multiplexing mode described above with respect to FIG. 7.

As shown by reference number 820, the UE may multiplex an SRS with a PUSCH communication. For example, the UE may multiplex the SRS with the PUSCH communication utilizing FDM. In some aspects, the UE may multiplex an SRS in this manner when operating in the second multiplexing mode described above with respect to FIG. 7. In some aspects, the UE may rate-match the PUSCH communication around the resource elements (e.g., subcarriers) that are occupied by the SRS. As an example of rate-matching, if an SRS occupies a subset of frequency tones on an OFDM symbol, such as frequency tone indexes 0, 4, and 8 within each resource block, then a PUSCH communication may be mapped to other frequency tones of each resource block on the same OFDM symbol, such as to frequency tone indexes 1, 2, 3, 5, 6, 7, 9, 10, and 11.

As shown by reference number 830, the UE may multiplex an SRS utilizing spatial multiplexing (e.g., where multiple channels are overlapping and different communications are transmitted on the same resource elements). For example, the UE may multiplex the SRS in a manner such that the SRS partially overlaps a symbol that includes a PUSCH communication, and the SRS and the PUSCH communication may use the same resource elements (e.g., subcarriers). In some aspects, the UE may multiplex an SRS in this manner when operating in the third multiplexing mode described above with respect to FIG. 7.

As indicated above, FIG. 8 is provided as an example. Other examples are possible and may differ from what was described with respect to FIG. 8.

Figure 9:
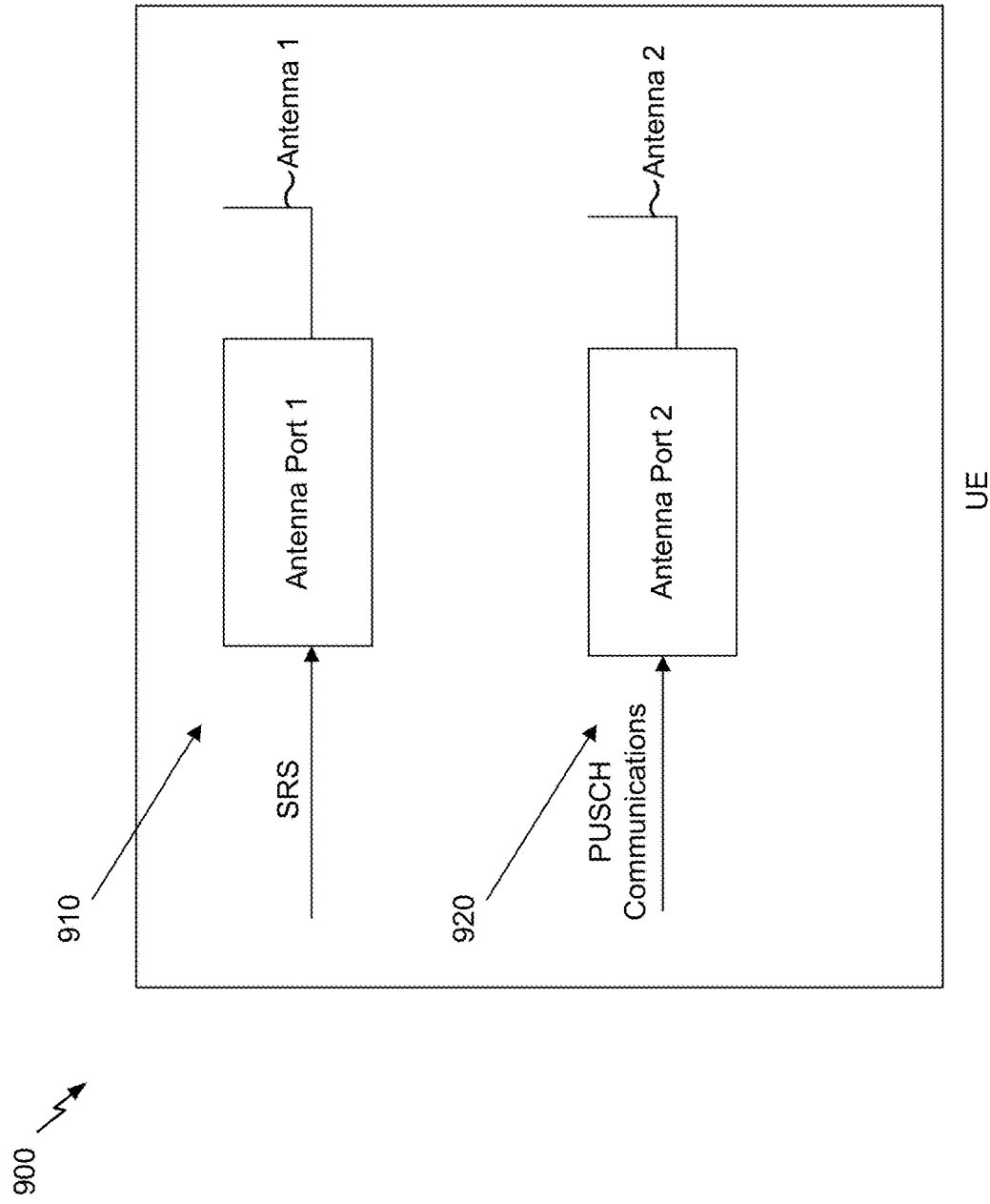
FIG. 9 is a diagram illustrating an example of spatial multiplexing of an SRS and a PUSCH communication, in accordance with various aspects of the present disclosure.

FIG. 9 is a diagram illustrating an example 900 of spatial multiplexing of an SRS and a PUSCH communication, in accordance with various aspects of the present disclosure. As shown in FIG. 9, example 900 includes a UE. As further shown in FIG. 9, the UE may include multiple antenna ports (e.g., antenna port 1 and antenna port 2) and multiple physical antennas (e.g., antenna 1 and antenna 2). Assume, for example 900, that the UE has mapped antenna 1 to antenna port 1 and antenna 2 to antenna port 2. In some aspects, an antenna port may be defined such that a channel over which a symbol on the antenna port is conveyed can be inferred from the channel over which another symbol on the same antenna port is conveyed.

As shown in FIG. 9, a UE may be configured with two antenna ports corresponding to two antennas (shown as antenna port 1 for antenna 1 and antenna port 2 for antenna 2). As shown by reference number 910, the UE may transmit an SRS via antenna port 1 and antenna 1. As shown by reference number 920, the UE may transmit a PUSCH communication via antenna port 2 and antenna 2. In some aspects, the UE may transmit the SRS and the PUSCH communication after configuring the SRS and the PUSCH communication in a manner similar to that described elsewhere herein. In this way, the UE may spatially multiplex an SRS and a PUSCH communication.

In this way, the UE may transmit the SRS via antenna port 1 and antenna 1 and the PUSCH communication via antenna port 2 and antenna 2 based at least in part on the SRS and the PUSCH communication colliding with each other. In some cases, the UE would transmit SRS(s) via both antenna ports and antennas in the absence of a collision between an SRS and a PUSCH communication. When a collision occurs between an SRS and a PUSCH communication, the UE may determine to not use one of the of the antenna ports of one of the antennas for SRS based at least in part on collision of the SRS and the PUSCH communication. In this case, the UE may determine to not resume transmission of the dropped SRS and a channel quality associated with the dropped SRS can be inferred from the PUSCH communication. A BS may perform measurement and/or channel estimation on a transmitted SRS and PUSCH communication to measure a strength of the antenna ports. The BS may indicate whether an antenna port used for the PUSCH communication is to be used for a subsequent PUSCH communication or whether the subsequent PUSCH communication should be transmitted via the antenna port used for the SRS. In other words, the BS may determine whether the UE is to switch an antenna port for one of multiple uplink transmissions from the UE based at least in part on a respective channel quality of multiple antenna ports, and the BS may use DCI to indicate whether to switch the antenna port, as described elsewhere herein.

As indicated above, FIG. 9 is provided as an example. Other examples are possible and may differ from what was described with respect to FIG. 9.

Figure 10:
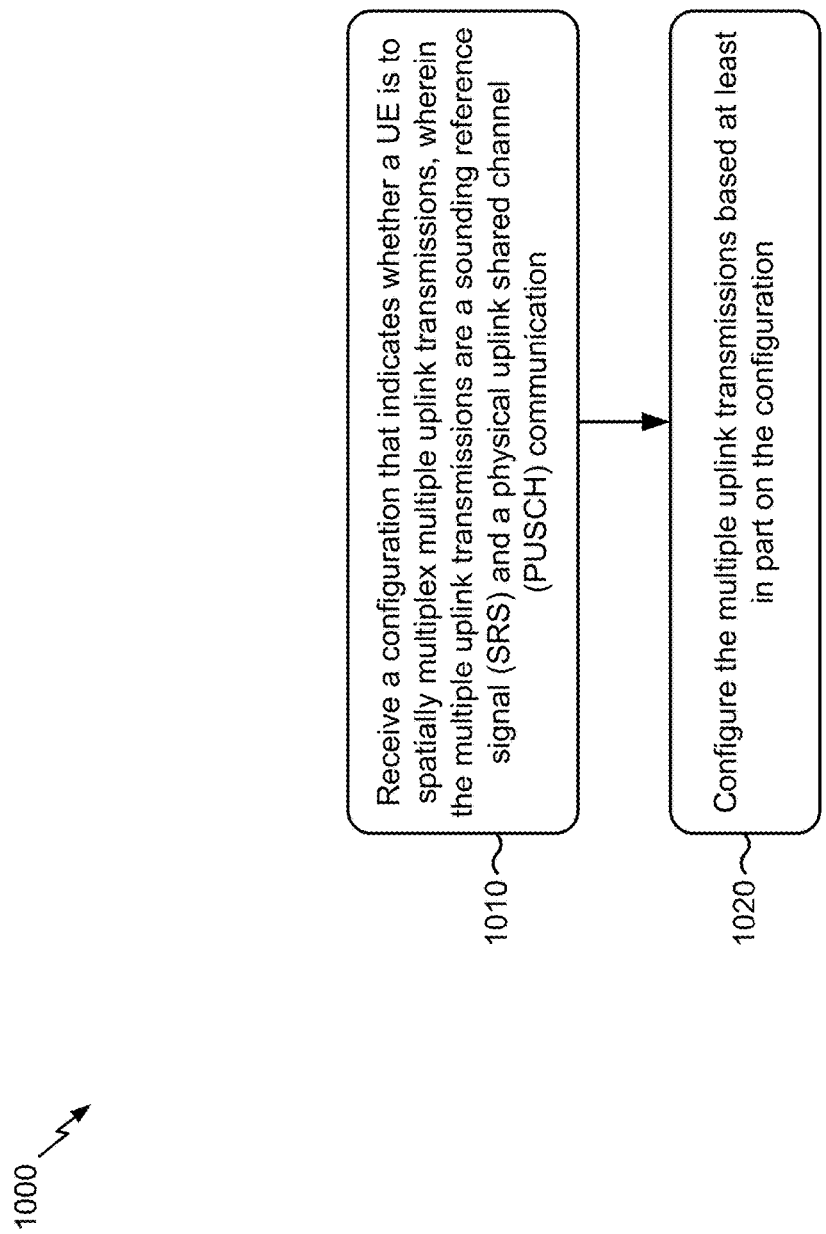
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs spatial multiplexing of an SRS and a PUSCH communication.

As shown in FIG. 10, in some aspects, process 1000 may include receiving a configuration that indicates whether a UE is to spatially multiplex multiple uplink transmissions, wherein the multiple uplink transmissions are a sounding reference signal (SRS) and a physical uplink shared channel (PUSCH) communication (block 1010). For example, the UE (e.g., using antenna 252, controller/processor 280, memory 282, and/or the like) may receive a configuration that indicates whether a UE is to spatially multiplex multiple uplink transmissions, wherein the multiple uplink transmissions are a sounding reference signal (SRS) and a physical uplink shared channel (PUSCH) communication.

As further shown in FIG. 10, in some aspects process 1000 may include configuring the multiple uplink transmissions based at least in part on the configuration (block 1020). For example, the UE (e.g., using controller/processor 280) may configure the multiple uplink transmissions based at least in part on the configuration.

Process 1000 may include additional aspects, such as any single aspect or any combination of aspects described below and/or in connection with one or more other processes described elsewhere herein.

In a first aspect, the UE may configure a multiplexing mode for the multiple uplink transmissions, wherein the multiplexing mode controls a manner in which the SRS is multiplexed with another communication. In a second aspect, alone or in combination with the first aspect, the multiplexing mode may comprise at least one of a first multiplexing mode wherein the SRS is multiplexed with a demodulation reference signal (DMRS) on a symbol associated with the DMRS utilizing frequency division multiplexing (FDM), a second multiplexing mode wherein the SRS is multiplexed with the PUSCH communication utilizing FDM, wherein the PUSCH communication is rate-matched around overlapping SRS resource elements, or a third multiplexing mode wherein the SRS is multiplexed with the PUSCH communication utilizing spatial division multiplexing.

In a third aspect, alone or in combination with the second aspect, the UE may receive an indication as to whether to operate in the second multiplexing mode or the third multiplexing mode. In a fourth aspect, alone or in combination with one or more of the first through third aspects, the UE may configure a phase coherency mode for the multiple uplink transmissions, wherein the phase coherency mode controls a manner in which the UE maintains a phase coherence of the multiple uplink transmissions. In a fifth aspect, alone or in combination with the fourth aspect, the phase coherency mode may include a first phase coherency mode wherein the UE is expected to maintain the phase coherence of the multiple uplink transmissions, or a second phase coherency mode wherein the UE is not expected to maintain the phase coherence of the multiple uplink transmissions. In a sixth aspect, alone or in combination with the fifth aspect, the UE may determine to maintain the phase coherence based at least in part on a set of rules, wherein the UE is configured to transmit the PUSCH communication and the SRS on a same symbol, a same physical resource block (PRB), and different antenna ports.

In a seventh aspect, alone or in combination with the fifth aspect, the UE may map a set of antenna ports to a set of physical antennas associated with the UE after configuring the first phase coherency mode, wherein the SRS and the PUSCH communication are transmitted on different physical antennas. In an eighth aspect, alone or in combination with the fifth aspect, the UE may determine that the UE is configured with usage set to codebook for the SRS in a resource set or to non-codebook for the SRS in the resource set, and to utilize a multiplexing technique in association with the SRS and the PUSCH communication, and may configure the first phase coherency mode based at least in part on determining that the UE is configured with the usage set to codebook or to non-codebook, and to utilize the multiplexing technique.

In a ninth aspect, alone or in combination with the fifth aspect, the UE may determine that the UE is configured with usage set to antenna switching for the SRS in a resource set, and to utilize a multiplexing technique in association with the SRS and the PUSCH communication, and may configure the second phase coherency mode based at least in part on determining that the UE is configured with the usage set to antenna switching and to utilize the multiplexing technique. In a tenth aspect, alone or in combination with the ninth aspect, the UE may transmit a demodulation reference signal (DMRS) or a phase-tracking reference symbol (PTRS) before, during, or after the symbols that are overlapped between SRS the PUSCH communication based at least in part on configuring the second phase coherency mode. In an eleventh aspect, alone or in combination with the ninth aspect, the UE may determine that the PUSCH communication and the SRS are scheduled to overlap in one or more symbols after configuring the second phase coherency mode, and may transmit the SRS in association with the PUSCH communication in the one or more symbols based at least in part on determining that the PUSCH communication and the SRS are scheduled to overlap.

In a twelfth aspect, alone or in combination with the fifth aspect, the UE may transmit an indicator after configuring the phase coherency mode, wherein the indicator indicates whether the phase coherence of the PUSCH communication is maintained or is not maintained by the UE. In a thirteenth aspect, alone or in combination with the twelfth aspect, the UE may determine an antenna port, of one or more antenna ports, for the SRS prior to transmitting the indicator, wherein the indicator further identifies the antenna port. In a fourteenth aspect, alone or in combination with one or more of the first through thirteenth aspects, the UE may transmit capability information that indicates a capability of the UE to spatially multiplex the multiple uplink transmissions prior to receiving the configuration. In a fifteenth aspect, alone or in combination with the fourteenth aspect, the UE may receive the configuration, in association with a radio resource control (RRC) message, after transmitting the capability information. In a sixteenth aspect, alone or in combination with the fourteenth aspect, the UE is configured to utilize a codebook-based technique in association with the SRS or a non-codebook-based technique in association with the SRS.

In a seventeenth aspect, alone or in combination with one or more of the first through sixteenth aspects, the UE may transmit the SRS via an antenna or antenna port associated with the UE and the PUSCH communication via a different antenna or antenna port associated with the UE after configuring the multiple uplink transmissions. In an eighteenth aspect, alone or in combination with one or more of the first through seventeenth aspects, the UE may receive uplink downlink control information (DCI) that indicates whether to switch an antenna port for an uplink transmission of the multiple uplink transmissions after transmitting the SRS and the PUSCH communication, and may determine whether to switch the antenna port based at least in part on the DCI after receiving the DCI. In a nineteenth aspect, alone or in combination with the eighteenth aspect, the DCI includes a value configured in a SRS resource index (SRI) field to indicate whether to switch the antenna port. In a twentieth aspect, alone or in combination with the eighteenth aspect, whether to switch the antenna port is based at least in part on a respective channel quality of multiple antenna ports, wherein the respective channel quality is based at least in part on the SRS and the PUSCH communication. In a twenty-first aspect, alone or in combination with one or more of the first through twentieth aspects, the UE may receive the configuration in association with an SRS resource configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
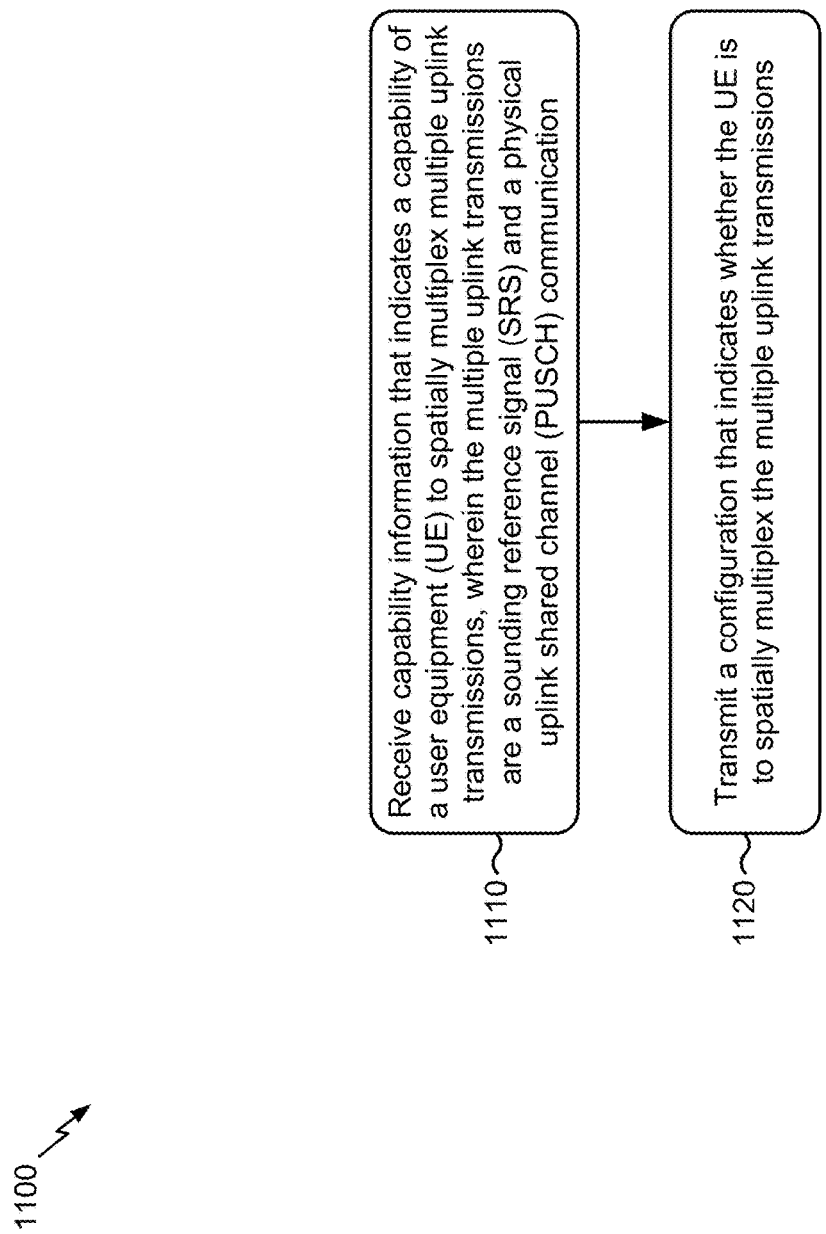
FIG. 11 is a diagram illustrating an example process performed, for example, by a base station, in accordance with various aspects of the present disclosure.

FIG. 11 is a diagram illustrating an example process 1100 performed, for example, by a BS, in accordance with various aspects of the present disclosure. Example process 1100 is an example where a BS (e.g., BS 110) communicates with a UE (e.g., UE 120) to implement spatial multiplexing of an SRS and a PUSCH communication.

As shown in FIG. 11, in some aspects, process 1100 may include receiving capability information that indicates a capability of a user equipment (UE) to spatially multiplex multiple uplink transmissions, wherein the multiple uplink transmissions are a sounding reference signal (SRS) and a physical uplink shared channel (PUSCH) communication (block 1110). For example, the BS (e.g., using antenna 234, controller/processor 240, and/or the like) may receive capability information that indicates a capability of a user equipment (UE) to spatially multiplex multiple uplink transmissions, wherein the multiple uplink transmissions are a sounding reference signal (SRS) and a physical uplink shared channel (PUSCH) communication.

As further shown in FIG. 11, some aspects of process 1100 may include transmitting a configuration that indicates whether the UE is to spatially multiplex the multiple uplink transmissions (block 1120). For example, the BS (e.g., using controller/processor 240) may transmit a configuration that indicates whether the UE is to spatially multiplex the multiple uplink transmissions.

Process 1100 may include additional aspects, such as any single aspect or any combination of aspects described below and/or in connection with one or more other processes described elsewhere herein.

In a first aspect, the configuration includes a value configured in a radio resource control (RRC) parameter. In a second aspect, alone or in combination with the first aspect, the BS may transmit the configuration to the UE in association with an SRS resource. In third aspect, alone or in combination with the first or second aspects, the BS may determine whether to perform joint processing across SRS resources based at least in part on the configuration. In a fourth aspect, alone or in combination with one or more of the first through third aspects, the BS may determine whether the UE is to switch an antenna port for one of the multiple uplink transmissions from the UE after transmitting the configuration, wherein the determining is based at least in part on a respective channel quality of multiple antenna ports, wherein the respective channel quality is based at least in part on the SRS and the PUSCH communication, and may transmit, to the UE, uplink downlink control information (DCI) to indicate whether the UE is to switch the antenna port for the one of the multiple uplink transmissions.

In a fifth aspect, alone or in combination with the fourth aspect, the BS may configure a value in a SRS resource index (SRI) field to indicate whether the UE is to switch the antenna port for the one of the multiple uplink transmissions, and may transmit the DCI with the value configured in the SRI. In a sixth aspect, alone or in combination with one or more of the first through fifth aspects, the BS may transmit, to the UE, an indication to operate in a particular multiplexing mode in association with transmitting the configuration. In a seventh aspect, alone or in combination with one or more of the first through sixth aspects, the BS may receive, from the UE, a demodulation reference signal (DMRS) or a phase-tracking reference symbol (PTRS) in association with the multiple uplink transmissions from the UE after transmitting the configuration.

In an eighth aspect, alone or in combination with one or more of the first through seventh aspects, the BS may receive an SRS overlapped with a PUSCH communication in one or more symbols after transmitting the configuration. In a ninth aspect, alone or in combination with one or more of the first through eighth aspects, the BS may receive an indication from the UE that indicates whether a phase coherence of the PUSCH communication is maintained after transmitting the configuration. In a tenth aspect, alone or in combination with one or more of the first through ninth aspects, the BS may receive the SRS and the PUSCH communication via different antennas or antenna ports associated with the UE after transmitting the configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with the phrase "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a configuration that indicates whether the UE is to spatially multiplex multiple uplink transmissions,
        wherein the multiple uplink transmissions are a sounding reference signal (SRS) and a physical uplink shared channel (PUSCH) communication;
    configuring the multiple uplink transmissions based at least in part on the configuration;
    receiving information that indicates whether to switch an antenna port for an uplink transmission of the multiple uplink transmissions after transmitting the SRS and the PUSCH communication; and
    determining whether to switch the antenna port based at least in part on the information.

2. The method of claim 1, wherein configuring the multiple uplink transmissions comprises:
    configuring a multiplexing mode for the multiple uplink transmissions,
        wherein the multiplexing mode controls a manner in which the SRS is multiplexed with another communication.

3. The method of claim 2, wherein the multiplexing mode comprises at least one of:
    a first multiplexing mode wherein the SRS is multiplexed with a demodulation reference signal (DMRS) on a symbol associated with the DMRS utilizing frequency division multiplexing (FDM),
    a second multiplexing mode wherein the SRS is multiplexed with the PUSCH communication utilizing FDM,
        wherein the PUSCH communication is rate-matched around overlapping SRS resource elements, or
    a third multiplexing mode wherein the SRS is multiplexed with the PUSCH communication utilizing spatial division multiplexing.

4. The method of claim 1, wherein configuring the multiple uplink transmissions comprises:
    configuring a phase coherency mode for the multiple uplink transmissions,
        wherein the phase coherency mode controls a manner in which the UE maintains a phase coherence of the multiple uplink transmissions.

5. The method of claim 4, wherein the phase coherency mode includes:
    a first phase coherency mode wherein the UE is expected to maintain the phase coherence of the multiple uplink transmissions, or
    a second phase coherency mode wherein the UE is not expected to maintain the phase coherence of the multiple uplink transmissions.

6. The method of claim 5, wherein configuring the phase coherency mode comprises:
    determining to maintain the phase coherence based at least in part on a set of rules,
        wherein the UE is configured to transmit the PUSCH communication and the SRS on:
            a same symbol,
            a same physical resource block (PRB), and
            different antenna ports.

7. The method of claim 5, further comprising:
    mapping a set of antenna ports to a set of physical antennas associated with the UE after configuring the first phase coherency mode,
        wherein the SRS and the PUSCH communication are transmitted on different physical antennas.

8. The method of claim 5, further comprising:
    determining that the UE is configured:
        with usage set to codebook for the SRS in a resource set or to non-codebook for the SRS in the resource set, and
        to utilize a multiplexing technique in association with the SRS and the PUSCH communication; and
    wherein configuring the phase coherency mode comprises:
        configuring the first phase coherency mode based at least in part on determining that the UE is configured with the usage set to codebook or to non-codebook, and to utilize the multiplexing technique.

9. The method of claim 5, further comprising:
    determining that the UE is configured:
        with usage set to antenna switching for the SRS in a resource set, and
        to utilize a multiplexing technique in association with the SRS and the PUSCH communication; and
    wherein configuring the phase coherency mode comprises:
        configuring the second phase coherency mode based at least in part on determining that the UE is configured with the usage set to antenna switching and to utilize the multiplexing technique.

10. The method of claim 9, further comprising:
    transmitting a demodulation reference signal (DMRS) or a phase-tracking reference symbol (PTRS) before, during, or after the symbols that are overlapped between the SRS and the PUSCH communication based at least in part on configuring the second phase coherency mode.

11. The method of claim 9, further comprising:
    determining that the PUSCH communication and the SRS are scheduled to overlap in one or more symbols after configuring the second phase coherency mode; and
    transmitting the SRS in association with the PUSCH communication in the one or more symbols based at least in part on determining that the PUSCH communication and the SRS are scheduled to overlap.

12. The method of claim 1, further comprising:
    transmitting capability information that indicates a capability of the UE to spatially multiplex the multiple uplink transmissions prior to receiving the configuration.

13. The method of claim 12, wherein receiving the configuration comprises:
    receiving the configuration, in association with a radio resource control (RRC) message, after transmitting the capability information.

14. The method of claim 1, wherein the information includes uplink downlink control information (DCI).

15. The method of claim 1, wherein the information includes a value configured in a SRS resource index (SRI) field to indicate whether to switch the antenna port.

16. The method of claim 1, wherein whether to switch the antenna port is based at least in part on a respective channel quality of multiple antenna ports,
    wherein the respective channel quality is based at least in part on the SRS and the PUSCH communication.

17. The method of claim 1, wherein receiving the configuration comprises:
receiving the configuration in association with an SRS resource configuration.

18. A method of wireless communication performed by a base station (BS), comprising:
receiving capability information that indicates a capability of a user equipment (UE) to spatially multiplex multiple uplink transmissions,
wherein the multiple uplink transmissions are a sounding reference signal (SRS) and a physical uplink shared channel (PUSCH) communication;
transmitting a configuration that indicates whether the UE is to spatially multiplex the multiple uplink transmissions;
determining whether the UE is to switch an antenna port for one of the multiple uplink transmissions from the UE after transmitting the configuration,
wherein the determining is based at least in part on a respective channel quality of multiple antenna ports,
wherein the respective channel quality is based at least in part on the SRS and the PUSCH communication; and
transmitting, to the UE, information to indicate whether the UE is to switch the antenna port for the one of the multiple uplink transmissions.

19. The method of claim 18, wherein the configuration includes a value configured in a radio resource control (RRC) parameter.

20. The method of claim 18, wherein transmitting the configuration comprises:
transmitting the configuration to the UE in association with an SRS resource.

21. The method of claim 18, further comprising:
determining whether to perform joint processing across SRS resources based at least in part on the configuration.

22. The method of claim 18, wherein the information is uplink downlink control information (DCI).

23. The method of claim 18, further comprising:
transmitting, to the UE, an indication to operate in a particular multiplexing mode in association with transmitting the configuration.

24. The method of claim 18, further comprising:
receiving an SRS overlapped with a PUSCH communication in one or more symbols after transmitting the configuration.

25. A user equipment (UE) for wireless communication, comprising:
a memory; and
one or more processors operatively coupled to the memory, the memory and the one or more processors configured to:
receive a configuration that indicates whether the UE is to spatially multiplex multiple uplink transmissions, wherein the multiple uplink transmissions are a sounding reference signal (SRS) and a physical uplink shared channel (PUSCH) communication;
configure the multiple uplink transmissions based at least in part on the configuration;
receive information that indicates whether to switch an antenna port for an uplink transmission of the multiple uplink transmissions after transmitting the SRS and the PUSCH communication; and
determine to switch the antenna port based at least in part on the information.

26. The UE of claim 25, wherein the one or more processors, when configuring the multiple uplink transmissions, are configured to:
configure a multiplexing mode for the multiple uplink transmissions,
wherein the multiplexing mode controls a manner in which the SRS is multiplexed with another communication,
wherein the multiplexing mode comprises at least one of:
a first multiplexing mode wherein the SRS is multiplexed with a demodulation reference signal (DMRS) on a symbol associated with the DMRS utilizing frequency division multiplexing (FDM),
a second multiplexing mode wherein the SRS is multiplexed with the PUSCH communication utilizing FDM,
wherein the PUSCH communication is rate-matched around overlapping SRS resource elements, or
a third multiplexing mode wherein the SRS is multiplexed with the PUSCH communication utilizing spatial division multiplexing.

27. The UE of claim 25, wherein the one or more processors, when configuring the multiple uplink transmissions, are configured to:
configure a phase coherency mode for the multiple uplink transmissions, wherein the phase coherency mode controls a manner in which the UE maintains a phase coherence of the multiple uplink transmissions.

28. The UE of claim 25, wherein the one or more processors are further configured to:
transmit capability information that indicates a capability of the UE to spatially multiplex the multiple uplink transmissions prior to receiving the configuration.

29. A base station (BS) for wireless communication, comprising:
a memory; and
one or more processors operatively coupled to the memory, the memory and the one or more processors configured to:
receive capability information that indicates a capability of a user equipment (UE) to spatially multiplex multiple uplink transmissions,
wherein the multiple uplink transmissions are a sounding reference signal (SRS) and a physical uplink shared channel (PUSCH) communication;
transmit a configuration that indicates whether the UE is to spatially multiplex the multiple uplink transmissions;
determine whether the UE is to switch an antenna port for one of the multiple uplink transmissions from the UE after transmitting the configuration,
wherein the determining is based at least in part on a respective channel quality of multiple antenna ports,
wherein the respective channel quality is based at least in part on the SRS and the PUSCH communication; and
transmit, to the UE, information to indicate whether the UE is to switch the antenna port for the one of the multiple uplink transmissions.

30. The BS of claim 29, wherein the one or more processors are further configured to:

transmit, to the UE, an indication to operate in a particular multiplexing mode in association with transmitting the configuration.

* * * * *